(12) United States Patent
Henry et al.

(10) Patent No.: US 7,802,078 B2
(45) Date of Patent: Sep. 21, 2010

(54) REP MOVE STRING INSTRUCTION EXECUTION BY SELECTING LOOP MICROINSTRUCTION SEQUENCE OR UNROLLED SEQUENCE BASED ON FLAG STATE INDICATIVE OF LOW COUNT REPEAT

(75) Inventors: G. Glenn Henry, Austin, TX (US); Terry Parks, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 183 days.

(21) Appl. No.: 12/270,010

(22) Filed: Nov. 13, 2008

(65) Prior Publication Data

US 2010/0064122 A1    Mar. 11, 2010

Related U.S. Application Data

(60) Provisional application No. 61/095,473, filed on Sep. 9, 2008.

(51) Int. Cl.
*G06F 9/22* (2006.01)
(52) U.S. Cl. ........................... 712/208; 712/211
(58) Field of Classification Search .................. None
See application file for complete search history.

(56) References Cited

U.S. PATENT DOCUMENTS

| | | | | |
|---|---|---|---|---|
| 4,885,682 | A * | 12/1989 | Komoto | 712/236 |
| 5,752,015 | A * | 5/1998 | Henry et al. | 712/241 |
| 7,366,885 | B1 * | 4/2008 | Radhakrishnan et al. | 712/241 |
| 2005/0144426 | A1 * | 6/2005 | Col et al. | 712/241 |

* cited by examiner

*Primary Examiner*—Kenneth S Kim
(74) *Attorney, Agent, or Firm*—E. Alan Davis; James W. Huffman

(57) ABSTRACT

A microprocessor REP MOVS macroinstruction specifies the word length of the string in the IA-32 ECX register. The microprocessor includes a memory, configured to store a first and second sequence of microinstructions. The first sequence conditionally transfers control to a microinstruction within the first sequence based on the ECX register. The second sequence does not conditionally transfer control based on the ECX register. The microprocessor includes an instruction translator, coupled to the memory. In response to a macroinstruction that moves an immediate value into the ECX register, the instruction translator sets a flag and saves the immediate value. In response to a macroinstruction that modifies the ECX register in a different manner, the translator clears the flag. In response to a REP MOVS macroinstruction, the instruction translator transfers control to the first sequence if the flag is clear; and transfers control to the second sequence if the flag is set.

21 Claims, 6 Drawing Sheets

Fig. 4b (alternate embodiment)

Fig. 7 (alternate embodiment)
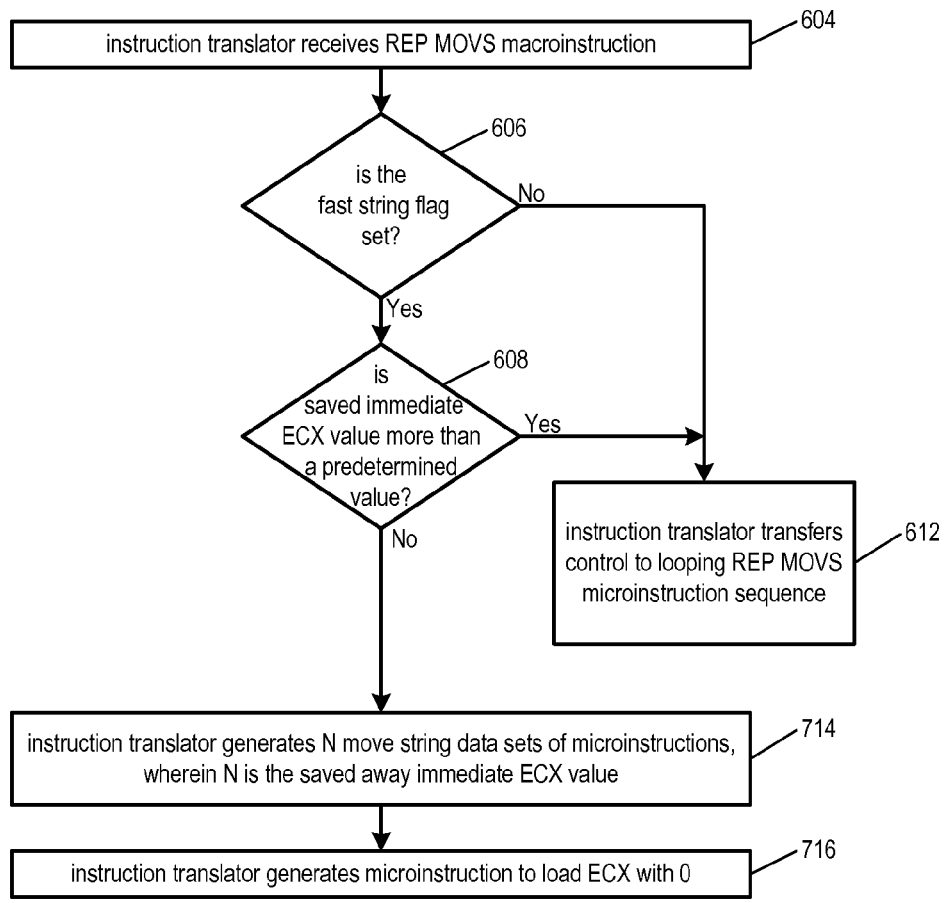

REP MOVE STRING INSTRUCTION EXECUTION BY SELECTING LOOP MICROINSTRUCTION SEQUENCE OR UNROLLED SEQUENCE BASED ON FLAG STATE INDICATIVE OF LOW COUNT REPEAT

CROSS REFERENCE TO RELATED APPLICATIONS

This application claims priority to Provisional Application 61/095,473, filed Sep. 9, 2008, which is hereby incorporated by reference in its entirety for all purposes.

FIELD OF THE INVENTION

The present invention relates in general to microprocessors, and more particularly to efficient means of generating microinstructions for performing string move macroinstructions.

BACKGROUND OF THE INVENTION

The Intel Architecture (IA-32) instruction set (also commonly referred to as the x86 architecture) includes a string (MOVS) macroinstruction (referred to in the Intel Software Developer's Manual as the "move data from string to string" instruction). The MOVS macroinstruction moves the byte (8-bit), word (16-bit), doubleword (32-bits), or quadword (64 bits) from a source memory location to a destination memory location. A repeat (REP) prefix may be added to the MOVS macroinstruction to repeat the MOVS macroinstruction multiple times to move a sequence of bytes, words, doublewords, or quadwords.

A program that includes a REP MOVS macroinstruction must also include a prior instruction that loads the ECX register with a count that specifies the number of times the MOVS macroinstruction is to be repeated. That is, the ECX register specifies the size of the string to be moved, i.e., the number of bytes, words, doublewords, quadwords that are to be moved from the source memory location to the destination memory location. Details of the MOVS macroinstruction are provided on pages 3-656 to 3-659 of the IA-32 Intel Architecture Software Developer's Manual, Volume 2A: Instruction Set Reference, A-M, and details of the REP prefix are provided on pages 4-211 to 4-215 of the IA-32 Intel Architecture Software Developer's Manual, Volume 2B: Instruction Set Reference, N-Z, all of which are hereby incorporated by reference in their entirety for all purposes.

Many modern microprocessors have an instruction translator that converts macroinstructions such as x86 macroinstructions into one or more microinstructions that execute within the microprocessor's microarchitecture. When the microprocessor has executed all of the constituent microinstructions it will have accomplished the semantics of the macroinstruction. The instruction translator itself generates a different microinstruction sequence for each of the more common macroinstructions to accomplish the macroinstruction. Additionally, a microinstruction ROM is coupled to the instruction translator. The microinstruction ROM stores microinstruction sequences that accomplish the semantics of more complex or less frequently occurring x86 macroinstructions, which reduces the complexity of the instruction translator. Thus, microinstruction sequences may be either generated by the instruction translator or output by the microinstruction ROM, depending on design criteria of the microprocessor.

Because string move instructions involve repetitive operations, they are accomplished by a sequence of microinstructions within the microinstruction ROM that execute in a loop. The count value in the ECX register determines the number of times the microinstructions in the loop are executed. The loop body decrements the ECX register value, and a conditional branch instruction at the end of the loop conditionally branches back to the top of the loop based on the current value in the ECX register. Loops are efficient in terms of number of microinstructions that must be stored. However, the execution performance of loops is relatively poor because the conditional branch instructions require a relatively large number of clock cycles to execute. Furthermore, if the microprocessor mispredicts the branch outcome, the penalty to recover from the misprediction is relatively large, particularly in deeply pipelined microprocessors. Additionally, the presence of a branch microinstruction may prevent the microprocessor from performing some microinstruction optimizations that it may otherwise be able to perform. Therefore, what is needed is a way to improve the performance of REP MOVS macroinstructions.

BRIEF SUMMARY OF INVENTION

In one aspect, the present invention provides a microprocessor for performing an Intel Architecture (IA-32) repeat move data from string to string (REP MOVS) macroinstruction. The word length of the string is specified in the IA-32 architectural ECX register. The microprocessor includes a memory, configured to store a first sequence of microinstructions for accomplishing the REP MOVS macroinstruction that includes a control transfer microinstruction that, when executed, conditionally transfers control to a microinstruction within the first sequence based on the word length stored in the IA-32 architectural ECX register. The memory is also configured to store a second sequence of microinstructions for accomplishing the REP MOVS macroinstruction that does not include any control transfer microinstructions that conditionally transfer control based on the word length stored in the IA-32 architectural ECX register. The microprocessor includes an instruction translator, coupled to the memory. In response to a macroinstruction that moves an immediate value into the IA-32 architectural ECX register, the instruction translator sets a flag and saves the immediate value. In response to a macroinstruction that modifies the IA-32 architectural ECX register in a manner other than moving an immediate value into the IA-32 architectural ECX register, the instruction translator clears the flag. In response to a REP MOVS macroinstruction, the instruction translator transfers control to the first sequence of microinstructions in the memory, if the flag is clear. The instruction translator transfers control to a location within the second sequence of microinstructions in the memory based on the saved immediate value, if the flag is set.

In another aspect, the present invention provides a method for a microprocessor to perform an Intel Architecture (IA-32) repeat move data from string to string (REP MOVS) macroinstruction, wherein the word length of the string is specified in the IA-32 architectural ECX register. The microprocessor includes a memory for storing microinstruction sequences. In response to a macroinstruction that moves an immediate value into the IA-32 architectural ECX register, the method includes setting a flag and saving the immediate value. In response to a macroinstruction that modifies the IA-32 architectural ECX register in a manner other than moving an immediate value into the IA-32 architectural ECX register, the method includes clearing the flag. In response to a REP MOVS macroinstruction, the method includes determining whether the flag is set or clear and transferring control to a first sequence of microinstructions for accomplishing the REP MOVS macroinstruction in the memory, if the flag is clear. The method includes transferring control to a location within a second sequence of microinstructions for accomplishing the REP MOVS macroinstruction in the memory based on the save immediate value, if the flag is set. The first sequence of microinstructions includes a control transfer microinstruction that, when executed, conditionally transfers control to a microinstruction within the first sequence based on the word length stored in the IA-32 architectural ECX register. The second sequence of microinstructions does not include any control transfer microinstructions that conditionally transfer control based on the word length stored in the IA-32 architectural ECX register.

In yet another aspect, the present invention provides a microprocessor for performing an Intel Architecture (IA-32) repeat move data from string to string (REP MOVS) macroinstruction, wherein the word length of the string is specified in the IA-32 architectural ECX register. The microprocessor includes a memory, configured to store a first sequence of microinstructions for accomplishing the REP MOVS macroinstruction that includes a control transfer microinstruction that, when executed, conditionally transfers control to a microinstruction within the first sequence based on the word length stored in the IA-32 architectural ECX register. The microprocessor includes an instruction translator, coupled to the memory. In response to a macroinstruction that moves an immediate value into the IA-32 architectural ECX register, the instruction translator sets a flag and saves the immediate value. In response to a macroinstruction that modifies the IA-32 architectural ECX register in a manner other than moving an immediate value into the IA-32 architectural ECX register, the instruction translator clears the flag. In response to a REP MOVS macroinstruction, the instruction translator transfers control to the first sequence of microinstructions in the memory, if the flag is clear, and generates a second sequence of microinstructions based on the saved immediate value, if the flag is set. The second sequence of microinstructions accomplishes the REP MOVS macroinstruction, and does not include any control transfer microinstructions that conditionally transfer control based on the word length stored in the IA-32 architectural ECX register.

In yet another aspect, the present invention provides a microprocessor for performing an Intel Architecture (IA-32) REP STOS, REP INS, REP OUTS, REP LODS, REP CMPS, or REP SCAS macroinstruction, wherein the word length of the string is specified in the IA-32 architectural ECX register. The microprocessor includes a memory, configured to store a first sequence of microinstructions for accomplishing the REP STOS, REP INS, REP OUTS, REP LODS, REP CMPS, or REP SCAS macroinstruction that includes a control transfer microinstruction that, when executed, conditionally transfers control to a microinstruction within the first sequence based on the word length stored in the IA-32 architectural ECX register. The memory is also configured to store a second sequence of microinstructions for accomplishing the REP STOS, REP INS, REP OUTS, REP LODS, REP CMPS, or REP SCAS macroinstruction that does not include any control transfer microinstructions that conditionally transfer control based on the word length stored in the IA-32 architectural ECX register. The microprocessor includes an instruction translator, coupled to the memory. In response to a macroinstruction that moves an immediate value into the IA-32 architectural ECX register, the instruction translator sets a flag and saves the immediate value. In response to a macroinstruction that modifies the IA-32 architectural ECX register in a manner other than moving an immediate value into the IA-32 architectural ECX register, the instruction translator clears the flag. In response to a REP STOS, REP INS, REP OUTS, REP LODS, REP CMPS, or REP SCAS macroinstruction, the instruction translator transfers control to the first sequence of microinstructions in the memory, if the flag is clear. The instruction translator transfers control to a location within the second sequence of microinstructions in the memory based on the saved immediate value, if the flag is set.

In yet another aspect, the present invention provides a computer program product for use with a computing device. The computer program product includes a computer usable storage medium, having computer readable program code embodied in the medium, for specifying a microprocessor for performing an Intel Architecture (IA-32) repeat move data from string to string (REP MOVS) macroinstruction. The word length of the string is specified in the IA-32 architectural ECX register. The computer readable program code includes a first program code for specifying a memory, configured to store a first sequence of microinstructions for accomplishing the REP MOVS macroinstruction that includes a control transfer microinstruction that, when executed, conditionally transfers control to a microinstruction within the first sequence based on the word length stored in the IA-32 architectural ECX register. The memory is also configured to store a second sequence of microinstructions for accomplishing the REP MOVS macroinstruction that does not include any control transfer microinstructions that conditionally transfer control based on the word length stored in the IA-32 architectural ECX register. The computer readable program code also includes a second program code for specifying an instruction translator, coupled to the memory. In response to a macroinstruction that moves an immediate value into the IA-32 architectural ECX register, the instruction translator sets a flag and saves the immediate value. In response to a macroinstruction that modifies the IA-32 architectural ECX register in a manner other than moving an immediate value into the IA-32 architectural ECX register, the instruction translator clears the flag. In response to a REP MOVS macroinstruction, the instruction translator transfers control to the first sequence of microinstructions in the memory, if the flag is clear; and transfers control to a location within the second sequence of microinstructions in the memory based on the saved immediate value, if the flag is set.

An advantage of the present invention is that it potentially improves the execution performance of repeat string macroinstructions by eliminating looping in the microinstruction sequences that accomplish the repeat string macroinstructions.

The present invention is implemented within a microprocessor device which may be used in a general purpose computer.

BRIEF DESCRIPTION OF THE DRAWINGS

FIG. 1b is a block diagram illustrating an example of the looping REP MOVS microinstruction sequence 144 of FIG. 1a.

FIG. 4b is a flowchart illustrating operation of instruction translator 206 of FIG. 2 in response to a MOV ECX, immediate macroinstruction according to an alternate embodiment of the present invention.

FIG. 7 is a flowchart illustrating operation of the instruction translator 206 of FIG. 2 in response to receiving a REP MOVS macroinstruction according to an alternate embodiment of the present invention.

DETAILED DESCRIPTION OF THE INVENTION

Figure 1A:
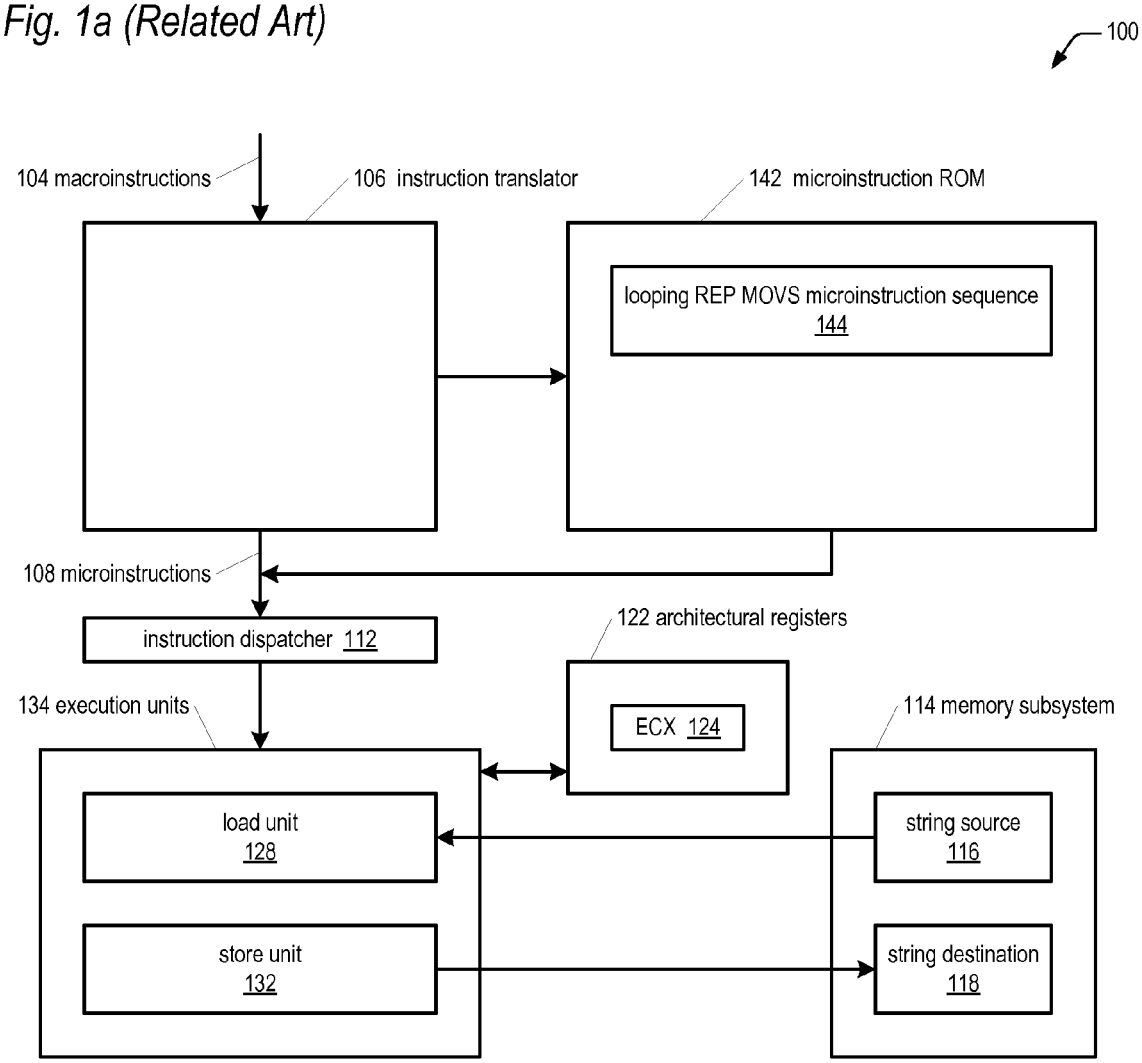
FIG. 1a is a block diagram of a related art microprocessor.

Referring now to FIG. 1a, a block diagram of a related art microprocessor 100 is shown. An instruction cache (not shown) provides macroinstructions 104 to an instruction translator 106. The macroinstructions 104 include a REP MOVS macroinstruction among other macroinstructions 104. Instruction translator 106 converts macroinstructions 104 into microinstructions 108, where a single macroinstruction 104 may be converted into one or more microinstructions 108. For more complex or less frequently used macroinstructions 104, the instruction translator 106 may obtain the required microinstructions 108 from a microinstruction ROM 142. Microinstruction ROM 142 stores different microinstruction sequences for many macroinstructions 104. For example, a REP MOVS macroinstruction may have one microinstruction sequence 144 and other complex or infrequently used macroinstructions may have different microinstruction sequences.

Microinstructions 108 are received by an instruction dispatcher 112, which schedules microinstructions 108 for execution by execution units 134. Execution units 134 includes various functional units that perform integer and floating point operations, data moves, address calculations, branch operations, and so on, to support all operations required by the macroinstruction set of the microprocessor 100. In one embodiment, execution units 134 include a load unit 128 and a store unit 132. Load unit 128 loads data from a memory subsystem 114 of microprocessor 100. Memory subsystem 114 includes one or more cache memories of microprocessor 100 in addition to a bus interface unit for accessing memory locations external to microprocessor 100. In the case of a REP MOVS macroinstruction 104, load unit 128 fetches data to be moved from a string source 116 in memory (shown in FIG. 1 in memory subsystem 114). Store unit 132 stores data to a string destination 118 in memory (shown in FIG. 1 in memory subsystem 114).

String source 116 and string destination 118 include multiple memory locations each. A REP MOVS macroinstruction 104 moves a string of data values from one group of memory locations in string source 116 to another group of memory locations in string destination 118. Execution units 134 are coupled to architectural registers 122 of microprocessor 100. Architectural registers 122 includes an ECX register 124.

Figure 1B:
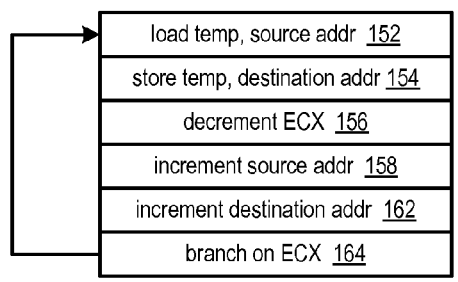

FIG. 1b is a block diagram illustrating an example of the looping REP MOVS microinstruction sequence 144 of FIG. 1a. The microinstruction sequence 144 is transferred from microinstruction ROM 142 to instruction dispatcher 112. Prior to microinstruction ROM 142 issuing looping REP MOVS microinstruction sequence 144 to instruction dispatcher 112, other macroinstructions 104 are received by instruction translator 106 that load architectural registers 122 with source and destination locations for the string move and the number of words to move, i.e., the size of the string. Unless otherwise specified, the term "word" as used herein refers to a fixed-size plurality of bits of data that may be specified by a move string macroinstruction including, but not limited to, a byte (8-bits), word (16-bits), doubleword (32-bits), or quadword (64 bits).

The first microinstruction 108 of looping REP MOVS microinstruction sequence 144 is a load temp, source addr microinstruction 152, which loads data from a memory location within string source 116 into a temporary register of microprocessor 100. The memory location within string source 116 is designated by the DS:SI or DS:ESI registers, depending on the address size attribute of the macroinstruction 104. The second microinstruction 108 of looping REP MOVS microinstruction sequence 144 is a store temp, destination addr microinstruction 154, which stores the data value from the temporary register that was the destination of the load microinstruction 152 to a memory location in string destination 118 of memory subsystem 114. The memory location within string destination 118 is designated by the ES:DI or ES:EDI registers, depending on the address size attribute of the macroinstruction 104. The next microinstruction 108 in looping REP MOVS microinstruction sequence 144 is a decrement ECX microinstruction 156. Decrement ECX microinstruction 156 decrements the current ECX register 124 value, which decreases the count value to reflect the number of words of the string remaining to be moved. The next microinstruction 108 in looping REP MOVS microinstruction sequence 144 to be generated is an increment source address microinstruction 158, which updates the DS:SI or DS:ESI registers (depending on the address size attribute of the macroinstruction 104) to the next source data location in string source 116. The next microinstruction in looping REP MOVS microinstruction sequence 144 that is generated is an increment destination address microinstruction 162, which updates the ES:DI or ES:EDI registers (depending on the address size attribute of the macroinstruction 104) to the next destination data location in string destination 118. The last microinstruction 108 in looping REP MOVS microinstruction sequence 144 that is generated is a branch on ECX microinstruction 164, which branches back to load microinstruction 152 if the value in architectural register ECX 124 is not zero, and otherwise continues to the next microinstruction 108 after looping REP MOVS microinstruction sequence 144, which returns control back to the instruction translator 106.

As may be readily observed, the branch microinstruction 164 of looping REP MOVS microinstruction sequence 144 creates a loop. As discussed above, although the loop is space efficient, the execution performance of loops is relatively poor. In particular, if the string being moved is large, then the microprocessor 100 must execute a large number of branch microinstructions 164, which will result in relatively slow execution of the REP MOVS macroinstruction 104. For these reasons, it is desirable to reduce or eliminate branch microinstructions 164 in a microinstruction sequence that accomplishes the semantics of a REP MOVS macroinstruction 104.

Figure 2:
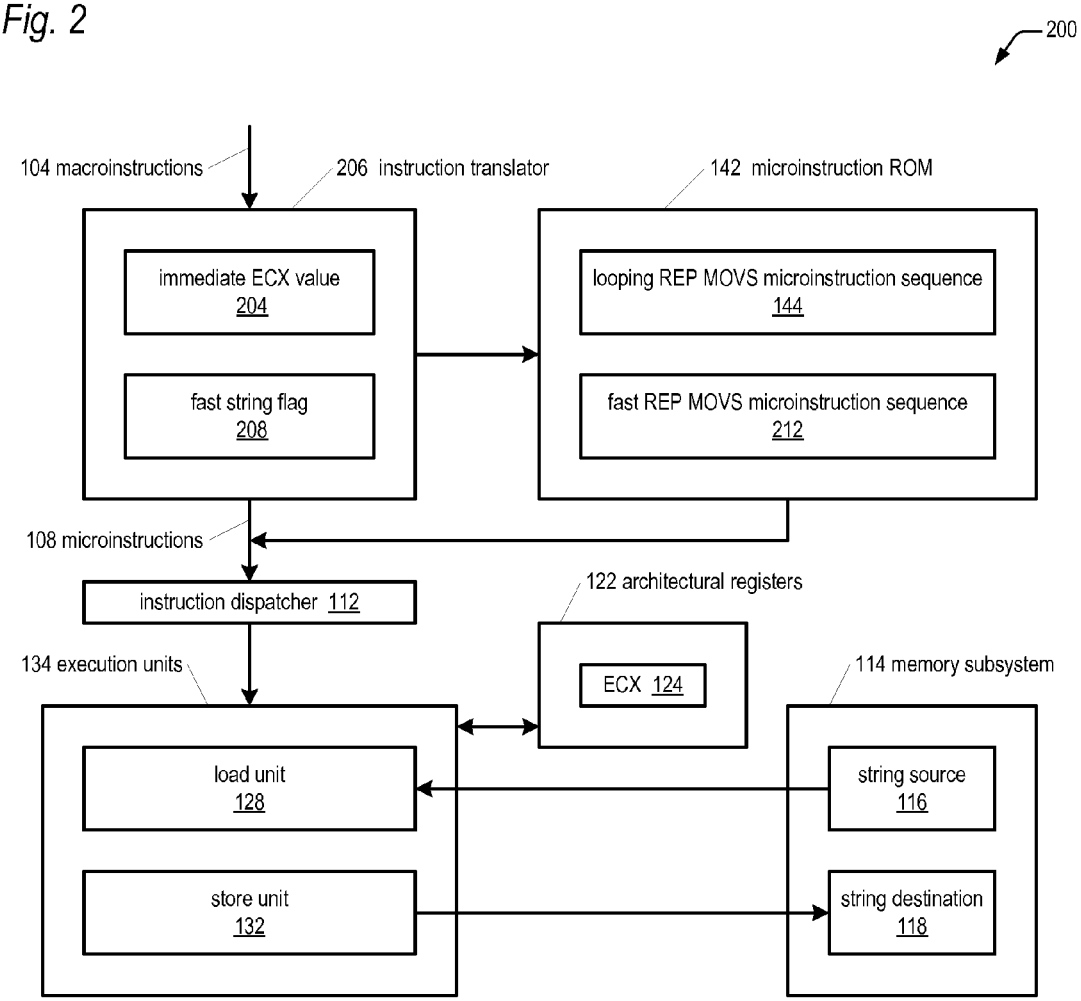
FIG. 2 is a block diagram of a microprocessor 200 of the present invention.

Referring now to FIG. 2, a block diagram of a microprocessor 200 of the present invention is shown. The microprocessor 200 of FIG. 2 is similar in many respects to the microprocessor 100 of FIG. 1. However, the instruction translator 206 of FIG. 2 is different from the instruction translator 106 of FIG. 1 because it includes a register for saving an immediate ECX value 204 and a fast string flag 208. When the instruction translator 206 encounters a MOV ECX, immediate macroinstruction, it sets fast string flag 208 and saves away the immediate value to the register 204 in anticipation that the immediate value will be used by a subsequent REP MOVS macroinstruction 104. Instruction translator 206 also generates a microinstruction 108 that writes the immediate data value to ECX register 124 of architectural registers 122.

Another difference between the instruction translator 206 of FIG. 2 and the instruction translator 106 of FIG. 1 is how it responds to macroinstructions that modify the contents of the ECX register 124 other than a MOV ECX, immediate, such as an arithmetic macroinstruction that modifies ECX based on the value of another register, e.g., ADD ECX, EAX. In particular, instruction translator 206 clears fast string flag 208 if it encounters macroinstructions 104 that modify the ECX register 124 and the macroinstruction 104 is not a MOV ECX, immediate macroinstruction.

Yet another difference between FIG. 2 and FIG. 1 is that FIG. 2 includes a fast REP MOVS microinstruction sequence 212 in the microinstruction ROM 124 that does not include any looping instructions such as the conditional branch 164 of FIG. 1, as described in detail with respect to FIG. 3 below. When the instruction translator 206 encounters a REP MOVS macroinstruction 104, if the fast string flag 208 is set and the saved immediate ECX value 204 is less than or equal to a predetermined value, the instruction translator 206 transfers control to an appropriate location within the fast REP MOVS microinstruction sequence 212 based on the saved immediate ECX value 204 as described below; otherwise, the instruction translator 206 transfers control to the looping REP MOVS microinstruction sequence 144.

Figure 3:
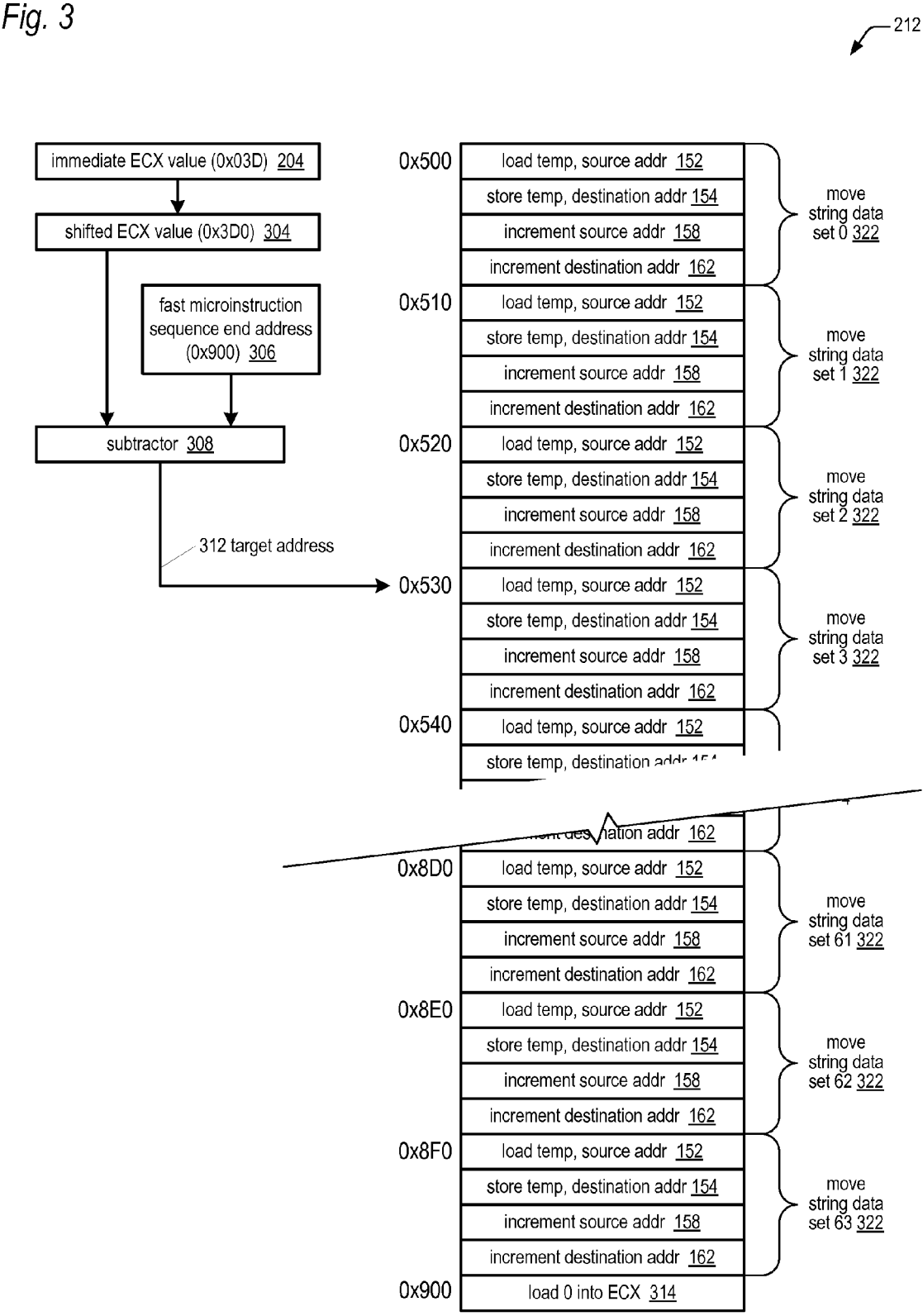
FIG. 3 is a block diagram illustrating the fast REP MOVS microinstruction sequence 212 of FIG. 2.

Referring now to FIG. 3, a block diagram illustrating the fast REP MOVS microinstruction sequence 212 of FIG. 2 is shown. Microinstruction sequence 212 includes a plurality of move string data sets of microinstructions 322, where the number of move string data sets 322 in microinstruction sequence 212 is equal to the predetermined value mentioned above with respect to FIG. 2. In the embodiment shown in FIG. 3, there are 64 move string data sets 322, and therefore the predetermined value is 64. Other embodiments may contain more or fewer move string data sets 322. The number of data sets 322 is a design decision based on the amount of available microinstruction ROM space and desired performance increase. Each move string data set 322 includes microinstructions 108 that move one data element of the string corresponding to the REP MOVS macroinstruction 104. Therefore, each move string data set 322 includes a load temp, source addr microinstruction 152, a store temp, destination addr microinstruction 154, an increment source addr microinstruction 158, and an increment destination addr microinstruction 162, similar to those of FIG. 1. The embodiment of FIG. 3 includes an optimization in which the architectural ECX register 124 value is loaded with zero at the end of fast REP MOVS microinstruction sequence 212, rather than decrementing the architectural ECX register 124 value in each of the move string data sets 322. However, in another embodiment, each move string data set 322 also includes a decrement ECX microinstruction 156 of FIG. 1.

Data strings that are moved or stored by a REP MOVS macroinstruction 104 may potentially contain hundreds or thousands of data words. That is, the value of ECX used by a REP MOVS macroinstruction 104 may be relatively large. Furthermore, the microinstruction ROM 142 contains many other microinstruction sequences in addition to microinstruction sequences 144 and 212, as described earlier. As a practical consideration, microinstruction ROM 142 is a fixed size. Therefore, the length of microinstruction sequence 212 is constrained to handle a REP MOVS macroinstruction 104 with an ECX value only up to a predetermined value. Any REP MOVS macroinstruction 104 with an ECX value larger than the predetermined value is handled by looping REP MOVS microinstruction sequence 144.

If the number of data locations to be moved is less than or equal to the predetermined value, the instruction translator 206 calculates the starting location within microinstruction sequence 212. The starting location is target address 312, which points to the first move string data set 322 to be output by the microinstruction ROM 142 from microinstruction sequence 212 for the current REP MOVS macroinstruction 104. For illustration purposes, an example is now described. In the example, assume each microinstruction 152, 154, 158, and 162 is 4 bytes in length such that each move string data set 322 is 16 bytes long; the predetermined value is 64 move string data sets 322; the starting address of the first move string data set 0 322 at address 0x500; consequently, the last move string data set 322 (move string data set 63) will start at address 0x8F0 in microinstruction ROM 142. The instruction translator 206 calculates the target address 312 by left-shifting saved immediate ECX value 204 four places since the length of a move string data set 322 is 16 bytes. That is, the instruction translator 106 effectively multiplies ECX value 204 by 16. In the example of FIG. 3, the ECX value 204 is 0x03D, which when left shifted 4 places produces a shifted ECX value 304 of 0x03D0. Next, subtractor 308 subtracts shifted ECX value 304 from the microinstruction sequence end address 306 to obtain target address 312. In the example, the microinstruction sequence end address 306 is 0x900, and the calculated target address 312 is 0x530. Because the move string data sets 322 of the microinstruction sequence 212 of the embodiment of FIG. 3 does not generate a microinstruction 108 that decrements ECX register 124, there is a final microinstruction 314 in microinstruction sequence 212 that loads zero into ECX register 124.

Figure 4A:
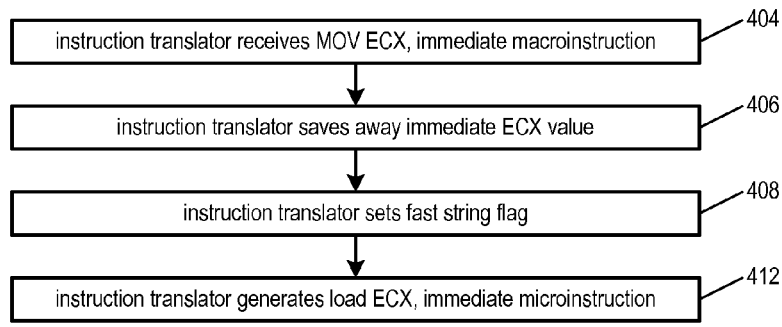
FIG. 4a is a flowchart illustrating operation of instruction translator 206 of FIG. 2 in response to a MOV ECX, immediate macroinstruction according to the present invention.
Figure 4A:
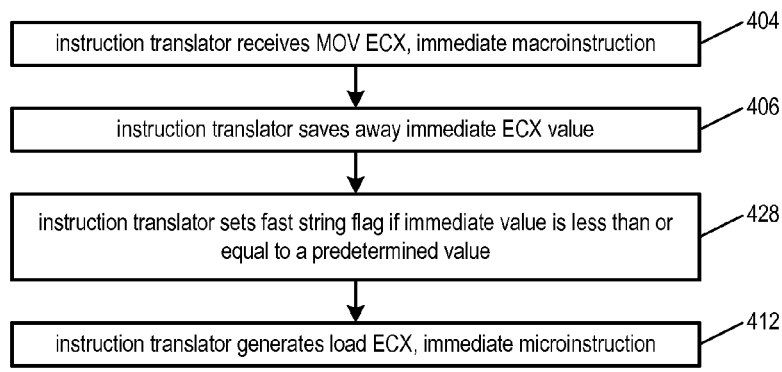

Referring now to FIG. 4a, a flowchart illustrating operation of instruction translator 206 of FIG. 2 in response to a MOV ECX, immediate macroinstruction according to the present invention is shown. Flow begins at block 404.

At block 404, instruction translator 206 receives a MOV ECX, immediate macroinstruction 104. A MOV ECX, immediate macroinstruction 104 loads a data value equal to the immediate value into the ECX register 124 of architectural registers 122. Flow proceeds to block 406.

At block 406, instruction translator 206 internally saves away the immediate data value specified by the MOV ECX, immediate macroinstruction 104 to its immediate ECX register 204. The instruction translator 206 will potentially be able to subsequently use the ECX value 204 to calculate a target address 312 into the fast REP MOVS microinstruction sequence 212 in response to encountering a REP MOVS macroinstruction 104, as described below. Flow proceeds to block 408.

At block 408, instruction translator 206 internally sets fast string flag 208. This arms the instruction translator 206 so that the more efficient fast REP MOVS microinstruction sequence 212 may be employed in lieu of the looping REP MOVS microinstruction sequence 144 to perform a REP MOVS macroinstruction 104 received by instruction translator 206 when the fast string flag 204 is set. Flow proceeds to block 412.

At block 412, instruction translator 206 generates a load ECX microinstruction to load the architectural ECX register 124 of architecture registers 122 with the immediate data value specified by the MOV ECX, immediate macroinstruction 104. Flow ends at block 412.

Referring now to FIG. 4b, a flowchart illustrating operation of instruction translator 206 of FIG. 2 in response to a MOV ECX, immediate macroinstruction according to an alternate embodiment of the present invention is shown. The flowchart of FIG. 4b is similar to the flowchart of FIG. 4a, except that block 408 is replaced by block 428. Block 428 is similar to block 408 of FIG. 4a, except that instruction translator 206 internally sets fast string flag 208 only if the immediate value specified by the MOV ECX, immediate macroinstruction 104 is less than or equal to the predetermined value.

Figure 5:
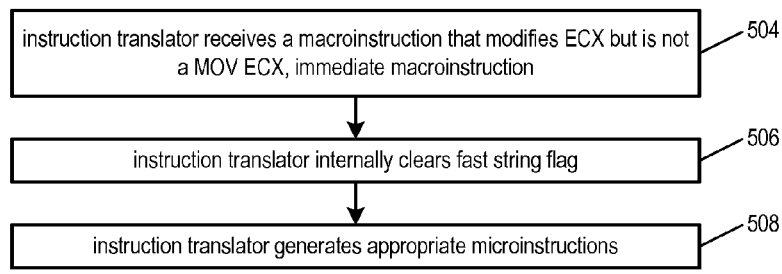
FIG. 5 is a flowchart illustrating operation of the instruction translator 206 of FIG. 2 in response to receiving a macroinstruction that modifies the ECX register but is not a MOV ECX, immediate macroinstruction according to the present invention.

Referring now to FIG. 5, a flowchart illustrating operation of the instruction translator 206 of FIG. 2 in response to receiving a macroinstruction 104 that modifies the ECX register 124 but is not a MOV ECX, immediate macroinstruction 104 according to the present invention is shown. Flow begins at step 504.

At block 504, instruction translator 206 receives a macroinstruction 104 that modifies the ECX register but is not a MOV ECX, immediate macroinstruction 104. Flow proceeds to block 506.

At block 506, instruction translator 206 internally clears fast string flag 208. The instruction translator 206 clears the fast string flag 208 because the instruction translator 206 cannot determine from the macroinstruction 104 what value the macroinstruction 104 will load the ECX register 124 in architecture registers 122 with when it is executed, since the value may be a function of the value of other registers in architecture registers 122 and/or a function of a particular arithmetic function, e.g., ADD ECX, EAX. Consequently, the instruction translator 206 will not transfer control to the fast REP MOVS microinstruction sequence 212 if it encounters a subsequent REP MOVS macroinstruction 104 since the instruction translator 206 cannot determine the proper location within the move string data sets 322 of FIG. 3 of the fast REP MOVS microinstruction sequence 212 to transfer control into. In contrast, in the case of a MOV ECX, immediate macroinstruction 104, such as described above with respect to FIGS. 4a and 4b, the instruction translator 206 knows exactly what the architectural ECX 124 value will be, namely the immediate value, because there is no computation involved and no dependency upon other register/memory values. Flow proceeds to block 508.

At block 508, instruction translator 206 generates an appropriate sequence of microinstructions 108 to accomplish the semantics of the macroinstruction 104 that modifies the ECX register 124 but is not a MOV ECX, immediate macroinstruction 104. Flow ends at block 508.

Figure 6:
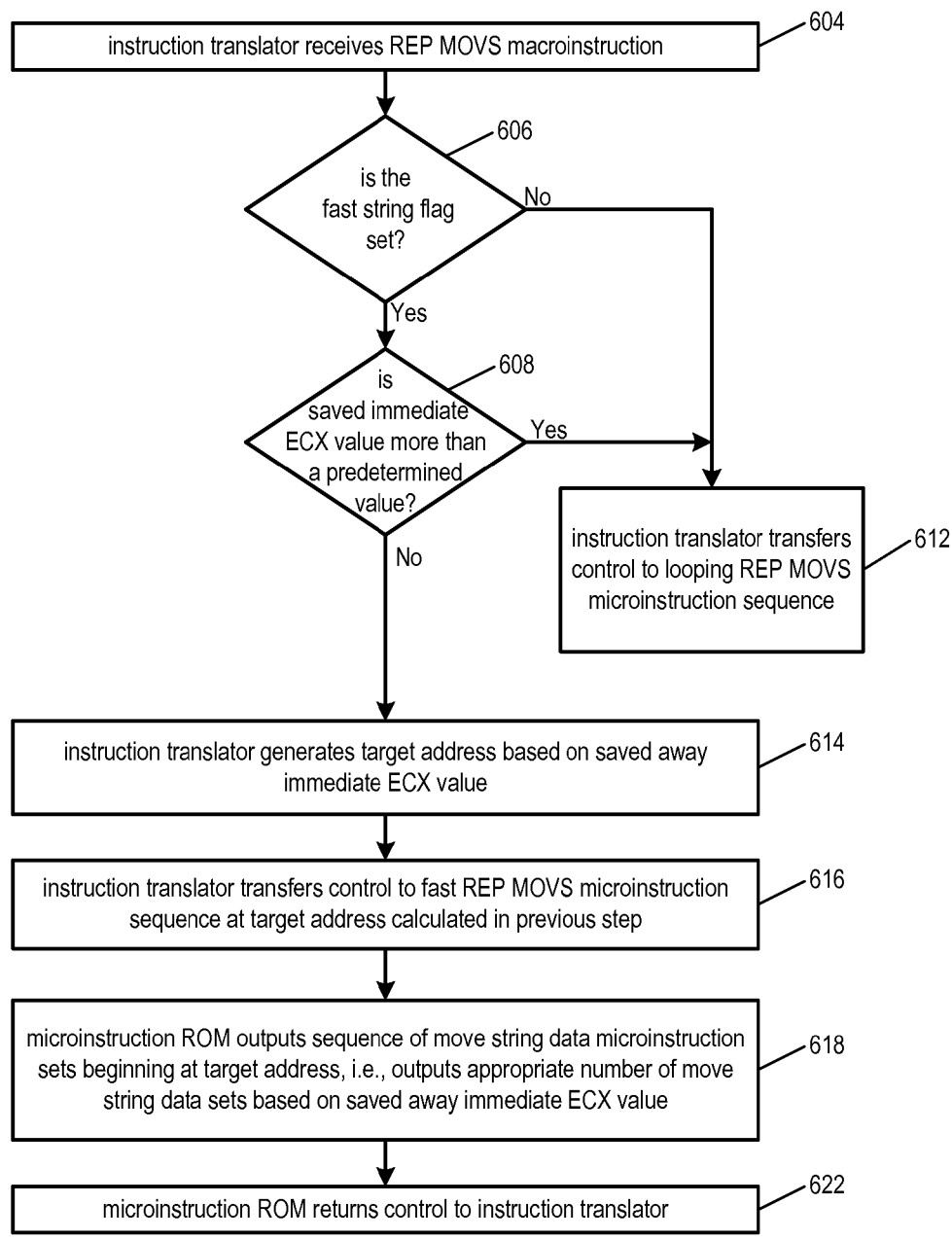
FIG. 6 is a flowchart illustrating operation of the instruction translator 206 of FIG. 2 in response to receiving a REP MOVS macroinstruction according to the present invention.

Referring now to FIG. 6, a flowchart illustrating operation of the instruction translator 206 of FIG. 2 in response to receiving a REP MOVS macroinstruction 104 according to the present invention is shown. Flow begins at block 604.

At block 604, instruction translator 206 encounters a REP MOVS macroinstruction 104. A REP MOVS macroinstruction 104 moves a string of data from a first group of locations in memory to a second group of locations in memory. Flow proceeds to decision block 606.

At decision block 606, instruction translator 206 determines if fast string flag 208 is set. Fast string flag 208 indicates that the last macroinstruction 104 that modified the contents of the ECX register 124 was a MOV ECX, immediate macroinstruction 104. Therefore, fast string flag 208 indicates that fast REP MOVS microinstruction sequence 212 may be able to be used for the REP MOVS macroinstruction 104. If the fast string flag 208 is set, then flow proceeds to decision block 608. If fast string flag 208 is not set, then flow proceeds to block 612.

At decision block 608, instruction translator 206 determines whether the immediate ECX value 204 is more than a predetermined value. The predetermined value is the maximum string length that can take advantage of the fast REP MOVS microinstruction sequence 212. FIG. 6 illustrates operation of the instruction translator 206 that operates according to the embodiment of FIG. 4a. However, for an instruction translator 106 that operates according to the alternate embodiment of FIG. 4b, the instruction translator 206 need not perform the step at decision block 608. If the immediate ECX value 204 is more than the predetermined value, then flow proceeds to block 612. If the immediate ECX value 204 is not more than the predetermined value, then flow proceeds to block 614.

At block 612, instruction translator 206 transfers control to the looping REP MOVS microinstruction sequence 144. Flow ends at block 612.

At block 614, instruction translator 206 generates target address 312 to fast REP MOVS microinstruction sequence 212, based on saved immediate ECX value 204. This will generate a target address 312 such that microinstruction ROM 142 outputs a number of move string data sets 322 equal to the saved immediate ECX value 204. In one embodiment, the instruction translator 206 generates the target address 312 as illustrated according to FIG. 3. Flow proceeds to block 616.

At block 616, instruction translator 206 transfers control to microinstruction ROM 142 at target address 312 calculated in block 614. Flow proceeds to block 618.

At block 618, microinstruction ROM 142 outputs a microinstruction sequence of load temp, source addr 152, store temp, destination addr 154, increment source addr 158, and increment destination addr 162 microinstructions 108 beginning at target address 312. The microinstructions 108 generated are a number of move string data sets 322 of fast REP MOVS microinstruction sequence 212 equal to the saved immediate ECX value 204. The sequence shown corresponds to a REP MOVS macroinstruction 104. Flow proceeds to block 622.

At block 622, after microinstruction ROM 142 has generated all microinstructions 108 associated with the REP MOVS macroinstruction 104, the microinstruction ROM 142 returns microinstruction control back to instruction translator 206. Flow ends at block 622.

Referring now to FIG. 7, a flowchart illustrating operation of the instruction translator 206 of FIG. 2 in response to receiving a REP MOVS macroinstruction 104 according to an alternate embodiment of the present invention is shown. The flowchart of FIG. 7 is similar to the flowchart of FIG. 6, except that blocks 614 through 622 are replaced with blocks 714 and 716. Flow proceeds from decision block 608 to block 714.

At block 714, instruction translator 206 generates N move string data sets 322 of FIG. 3, where N is the saved immediate ECX value 204 of FIG. 2. Each time the instruction translator 206 generates a move string data set 322, the instruction translator 206 decrements ECX value 204. When ECX value 204 has reached zero, all of the required N move string data sets 322 have been generated. Flow proceeds to block 716.

At block 716, all N move string data sets 322 have been generated, and instruction translator 206 generates a microinstruction 314 that loads ECX register 124 of architecture registers 122 with zero. Flow ends at block 716.

Although embodiments have been described with respect to a REP MOVS macroinstruction of the popular x86 architecture, the invention is not limited to that particular macroarchitecture, but may instead be modified to accommodate other macroarchitectures with repeat string macroinstructions. Furthermore, although embodiments have been described with respect to the REP MOVS macroinstruction 104, the techniques taught herein may also be employed to improve the performance of the IA-32 INS, OUTS, LOSD, STOS, CMPS, and SCAS macroinstructions 104 that include a REP prefix. For example, in the case of a REP STOS macroinstruction 104, the microinstruction ROM 142 includes a fast REP STOS microinstruction sequence that includes store string data sets similar to the move string data sets 322 of FIG. 3, except that the load microinstruction 152 and increment source address microinstruction 158 are not needed, and the store microinstruction 154 stores data from the IA-32 architected AL, AX, EAX, or RAX register, rather than the temporary register, to the string destination 118 in memory subsystem 114.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor for performing an Intel Architecture (IA-32) repeat move data from string to string (REP MOVS) macroinstruction, wherein the word length of the string is specified in the IA-32 architectural ECX register, the microprocessor comprising:

a memory, configured to store:
a first sequence of microinstructions for accomplishing the REP MOVS macroinstruction that includes a control transfer microinstruction that, when executed, conditionally transfers control to a microinstruction within the first sequence based on the word length stored in the IA-32 architectural ECX register; and
a second sequence of microinstructions for accomplishing the REP MOVS macroinstruction that does not include any control transfer microinstructions that conditionally transfer control based on the word length stored in the IA-32 architectural ECX register; and an instruction translator, coupled to said memory, configured to:
in response to a macroinstruction that moves an immediate value into the IA-32 architectural ECX register, set a flag and save the immediate value;
in response to a macroinstruction that modifies the IA-32 architectural ECX register in a manner other than moving an immediate value into the IA-32 architectural ECX register, clear the flag; and
in response to a REP MOVS macroinstruction:
transfer control to the first sequence of microinstructions in the memory, if the flag is clear; and
transfer control to a location within the second sequence of microinstructions in the memory based on the saved immediate value, if the flag is set.

2. The microprocessor as recited in claim 1, wherein in response to the macroinstruction that moves an immediate value into the IA-32 architectural ECX register, the instruction translator sets the flag only if the saved immediate value is less than or equal to a predetermined number.

3. The microprocessor as recited in claim 2, wherein the predetermined number is 64.

4. The microprocessor as recited in claim 1, wherein in response to the REP MOVS macroinstruction, the instruction translator transfers control to the location within the second sequence of microinstructions, if the flag is set, and only if the saved immediate value is less than or equal to a predetermined number.

5. The microprocessor as recited in claim 1, wherein in response to the REP MOVS macroinstruction, the instruction translator is further configured to clear the flag after it transfers control to the location within the second sequence of microinstructions.

6. The microprocessor as recited in claim 1, wherein the second sequence of microinstructions comprises an array of sequential sets of identical microinstructions each of which moves a word of the string, wherein the instruction translator is configured to calculate the location within the second sequence of microinstructions as an index into the array based on the saved immediate value.

7. The microprocessor as recited in claim 6, wherein the array size is N sequential sets, wherein the instruction translator is configured to calculate the index into the array as N minus the saved immediate value.

8. The microprocessor as recited in claim 6, wherein the instruction translator is configured to calculate the location within the second sequence of microinstructions at one of the sequential sets of the array located the saved immediate value before the end of the array.

9. A method for a microprocessor to perform an Intel Architecture (IA-32) repeat move data from string to string (REP MOVS) macroinstruction, wherein the word length of the string is specified in the IA-32 architectural ECX register, the microprocessor including a memory for storing microinstruction sequences, the method comprising:

in response to a macroinstruction that moves an immediate value into the IA-32 architectural ECX register, setting a flag and saving the immediate value;

in response to a macroinstruction that modifies the IA-32 architectural ECX register in a manner other than moving an immediate value into the IA-32 architectural ECX register, clearing the flag; and in response to a REP MOVS macroinstruction:
  determining whether the flag is set or clear;
  transferring control to a first sequence of microinstructions for accomplishing the REP MOVS macroinstruction in the memory, if the flag is clear; and
  transferring control to a location within a second sequence of microinstructions for accomplishing the REP MOVS macroinstruction in the memory based on the saved immediate value, if the flag is set;

wherein the first sequence of microinstructions includes a control transfer microinstruction that, when executed, conditionally transfers control to a microinstruction within the first sequence based on the word length stored in the IA-32 architectural ECX register;

wherein the second sequence of microinstructions does not include any control transfer microinstructions that conditionally transfer control based on the word length stored in the IA-32 architectural ECX register.

10. The method as recited in claim 9, further comprising:
in response to the macroinstruction that moves an immediate value into the IA-32 architectural ECX register, said setting the flag only if the saved immediate value is less than or equal to a predetermined number.

11. The method as recited in claim 10, wherein the predetermined number is 64.

12. The method as recited in claim 9, further comprising:
in response to the REP MOVS macroinstruction, said transferring control to the location within the second sequence of microinstructions, if the flag is set, and only if the saved immediate value is less than or equal to a predetermined number.

13. The method as recited in claim 9, further comprising:
in response to the REP MOVS macroinstruction, clearing the flag after said transferring control to the location within the second sequence of microinstructions.

14. The method as recited in claim 9, wherein the second sequence of microinstructions comprises an array of sequential sets of identical microinstructions each of which moves a word of the string, the method further comprising:
calculating the location within the second sequence of microinstructions as an index into the array based on the saved immediate value, prior to said transferring control to the location within the second sequence of microinstructions.

15. The method as recited in claim 14, wherein the array size is N sequential sets, wherein said calculating the location within the second sequence of microinstructions comprises calculating the index into the array as N minus the saved immediate value.

16. The method as recited in claim 14, wherein said calculating the location within the second sequence of microinstructions comprises calculating the location within the second sequence of microinstructions at one of the sequential sets of the array located the saved immediate value before the end of the array.

17. A microprocessor for performing an Intel Architecture (IA-32) repeat move data from string to string (REP MOVS) macroinstruction, wherein the word length of the string is specified in the IA-32 architectural ECX register, the microprocessor comprising:

a memory, configured to store a first sequence of microinstructions for accomplishing the REP MOVS macroinstruction that includes a control transfer microinstruction that, when executed, conditionally transfers control to a microinstruction within the first sequence based on the word length stored in the IA-32 architectural ECX register; and an instruction translator, coupled to said memory, configured to:
  in response to a macroinstruction that moves an immediate value into the IA-32 architectural ECX register, set a flag and save the immediate value;
  in response to a macroinstruction that modifies the IA-32 architectural ECX register in a manner other than moving an immediate value into the IA-32 architectural ECX register, clear the flag; and
  in response to a REP MOVS macroinstruction:
    transfer control to the first sequence of microinstructions in the memory, if the flag is clear; and
    generate a second sequence of microinstructions based on the saved immediate value, if the flag is set, wherein the second sequence of microinstructions accomplishes the REP MOVS macroinstruction, wherein the second sequence of microinstructions does not include any control transfer microinstructions that conditionally transfer control based on the word length stored in the IA-32 architectural ECX register.

18. The microprocessor as recited in claim 17, wherein the second sequence of microinstructions comprises sequential sets of identical microinstructions each of which moves a word of the string, wherein the instruction translator is configured to generate the sequential sets of identical microinstructions in the second sequence of microinstructions based on the saved immediate value.

19. The microprocessor as recited in claim 18, wherein the number of sequential sets of identical microinstructions generated by the instruction translator is equal to the saved immediate value.

20. A microprocessor for performing an Intel Architecture (IA-32) REP STOS, REP INS, REP OUTS, REP LODS, REP CMPS, or REP SCAS macroinstruction, wherein the word length of the string is specified in the IA-32 architectural ECX register, the microprocessor comprising:

a memory, configured to store:
  a first sequence of microinstructions for accomplishing the REP STOS, REP INS, REP OUTS, REP LODS, REP CMPS, or REP SCAS macroinstruction that includes a control transfer microinstruction that, when executed, conditionally transfers control to a microinstruction within the first sequence based on the word length stored in the IA-32 architectural ECX register; and
  a second sequence of microinstructions for accomplishing the REP STOS, REP INS, REP OUTS, REP LODS, REP CMPS, or REP SCAS macroinstruction that does not include any control transfer microinstructions that conditionally transfer control based on the word length stored in the IA-32 architectural ECX register; and an instruction translator, coupled to said memory, configured to:

in response to a macroinstruction that moves an immediate value into the IA-32 architectural ECX register, set a flag and save the immediate value;

in response to a macroinstruction that modifies the IA-32 architectural ECX register in a manner other than moving an immediate value into the IA-32 architectural ECX register, clear the flag; and in response to a REP STOS, REP INS, REP OUTS, REP LODS, REP CMPS, or REP SCAS macroinstruction:

transfer control to the first sequence of microinstructions in the memory, if the flag is clear; and transfer control to a location within the second sequence of microinstructions in the memory based on the saved immediate value, if the flag is set.

21. A computer program product for use with a computing device, the computer program product comprising:

a computer usable storage medium, having computer readable program code embodied in said medium, for specifying a microprocessor for performing an Intel Architecture (IA-32) repeat move data from string to string (REP MOVS) macroinstruction, wherein the word length of the string is specified in the IA-32 architectural ECX register, the computer readable program code comprising:

first program code for specifying a memory, configured to store:

a first sequence of microinstructions for accomplishing the REP MOVS macroinstruction that includes a control transfer microinstruction that, when executed, conditionally transfers control to a microinstruction within the first sequence based on the word length stored in the IA-32 architectural ECX register; and a second sequence of microinstructions for accomplishing the REP MOVS macroinstruction that does not include any control transfer microinstructions that conditionally transfer control based on the word length stored in the IA-32 architectural ECX register; and second program code for specifying a an instruction translator, coupled to said memory, configured to:

in response to a macroinstruction that moves an immediate value into the IA-32 architectural ECX register, set a flag and save the immediate value;

in response to a macroinstruction that modifies the IA-32 architectural ECX register in a manner other than moving an immediate value into the IA-32 architectural ECX register, clear the flag; and in response to a REP MOVS macroinstruction:

transfer control to the first sequence of microinstructions in the memory, if the flag is clear; and transfer control to a location within the second sequence of microinstructions in the memory based on the saved immediate value, if the flag is set.

* * * * *